United States Patent [19]

Kim

[11] Patent Number: 5,327,232

[45] Date of Patent: Jul. 5, 1994

[54] METHOD AND APPARATUS FOR DETECTING MOTION VECTORS

[75] Inventor: Sang-Ho Kim, Seoul, Rep. of Korea

[73] Assignee: Daewoo Electronics Co., Ltd., Seoul, Rep. of Korea

[21] Appl. No.: 73,747

[22] Filed: Jun. 8, 1993

[30] Foreign Application Priority Data

Jun. 9, 1992 [KR] Rep. of Korea ................. 1992-9947

[51] Int. Cl.[5] ..................... H04N 7/133; H04N 7/137
[52] U.S. Cl. ................................... 348/412; 348/699
[58] Field of Search ............................. 358/105, 136; H04N 7/133, 7/137

[56] References Cited

U.S. PATENT DOCUMENTS

| | | | |
|---|---|---|---|
| 4,992,870 | 2/1991 | Samad | 358/105 |
| 5,173,771 | 12/1992 | Kitazato | 358/105 |
| 5,200,820 | 4/1993 | Gharavi | 358/105 |
| 5,210,605 | 5/1993 | Zaccarin et al. | 358/105 |

Primary Examiner—Tommy P. Chin
Assistant Examiner—Richard Lee
Attorney, Agent, or Firm—William F. Pinsak

[57] ABSTRACT

Motion vectors are obtained, using a known block matching technique which is based on a block-by-block processing between a current and a preceding frames. Whenever an equivalent value to the minimum absolute value of difference which has the earliest priority is found during the block matching, the closer of the two vectors derived therefrom to a predetermined motion vector is chosen. The closest vector which has survived the process of matching the search block from the current frame against its corresponding search region in the preceding frame is assigned as the motion vector of the given block and stored in a vector memory as a predetermined motion vector to repeat the search process for a subsequent block in the current frame.

2 Claims, 3 Drawing Sheets

METHOD AND APPARATUS FOR DETECTING MOTION VECTORS

FIELD OF THE INVENTION

The present invention relates to an improved method and apparatus for determining the motion vectors representing a motion between two successive fields or frames of video signals.

DESCRIPTION OF THE PRIOR ART

In digital television systems such as video-telephone, teleconference and high definition television ("HDTV") systems, a large amount of digital data is required to define each video frame of television signals since each line of a video frame comprises a sequence of digital data referred to as pixels. However, the available frequency bandwidth of a conventional transmission channel to transmit the data is limited. Therefore, it has become necessary to reduce the substantial amount of data by way of employing various data compression techniques, which comprise, for example, a transform coding using a Discrete Cosine Transform("DCT") process that reduces the spatial correlation, and a motion compensation coding for reducing the temporal correlation between two successive frames.

In order to effectively carry out the data compression process, a motion compensation technique is normally used to predict current frame data from previous frame data based on an estimation of the motion between the current and the previous frames. Such estimated motion may be described in terms of a two-dimensional motion vector representing the displacement of certain pixels between the previous and the current frames.

There has been proposed a technique to determine motion vector from a sequence of video signals by a block matching algorithm which is based on a block-by-block processing (see MPEG (Moving Picture Experts Group) Video Simulation Model Three(SM3), ISO/IEC JTC1/SC2/WG11, MPEG 90/041, July 1990, published by Simulation Model Editiorial Group). In the block matching algorithm, a small block called a search block is taken from the current frame and a larger block called a search region is taken from the previous frame, wherein the current frame has a plurality of search blocks of an equal size and the previous frame has a corresponding number of search regions. A search block selected from the current frame is compared with all possible candidate blocks or subregions of the equal size included in its corresponding search region in the previous frame; and for each of the two compared blocks, an absolute value of difference ("AD") in the mean luminance level of the pixels present in each of the two blocks is calculated. And the smallest value among the calculated ADs is found to determine and define the motion vector as a measure of the displacement of the pixels between the search block and a candidate block or subregion entailing the smallest value. When the search block has been compared with all subregions included in its corresponding search region, comparison of a subsequent search block in the current frame and its corresponding is performed.

In this motion estimation, it would be most desirable or convenient to find only one minimum AD over the entire search region corresponding to the selected search block. Sometimes, however, there may be a plurality of equivalent minimum differences found during the block matching. In this case, the MPEG technique suggests that all of the other equivalent minimum differences, except the minimum difference that has the highest priority among them, i.e., the one found first, are dropped out although this is not a matter of standardization. As a result, it is difficult to correctly detect a motion vector with such correlation between the search block and the corresponds search region. In addition, since it is required to calculate all of the values to be truncated, it may take a substantial amount of wasteful calculation time.

SUMMARY OF THE INVENTION

It is therefore a primary object of the present invention to provide an improved method and apparatus for correctly determining motion vectors between two successive fields or frames of video signals.

In accordance with a first embodiment of the invention, there is provided a method for determining motion vectors between a current frame and its preceding frame of video signals, wherein the current frame is divided into a plurality of search blocks of an identical size and the preceding frame is divided into a corresponding number of search regions, each search region being further divided into a multiplicity of subregions of said identical size, which comprises the steps of: (a) comparing a given search block with a subregion selected from its corresponding search region and calculating the absolute value of difference in the mean luminance level between the pixels present in the search block and the pixels present in the selected subregion; (b) repeating step (a) above for each of the remaining subregions in said corresponding search region to thereby obtain a multiplicity of said absolute values of difference; (c) selecting the smallest value among the multiplicity of said absolute values of difference and defining a subset consisting of all minimum absolute values equal to the smallest value; (d) deriving a subset of candidate vectors from the subset of said minimum absolute values, each candidate vector representing the displacement of the pixels between the search block and a subregion, entailing a corresponding minimum absolute value equal to the smallest value; (e) comparing a predetermined motion vector retrieved from a storage means with the subset of said candidate vectors to determine the candidate vector closest to the predetermined motion vector; (f) assigning the closest candidate vector as the motion vector of the search block and storing same in the storage means as the predetermined motion vector for a subsequent search block; and (g) repeating steps (a) to (f) until the entire current frame is searched against its entire preceding frame, to thereby determine the motion vectors therebetween.

In accordance with a second embodiment of the invention, there is further provided an apparatus for determining motion vectors between a current frame and its preceding frame of video signals, wherein the current frame is divided into a plurality of search blocks of an identical size and the preceding frame is divided into a corresponding number of search regions, each search region being further divided into a multiplicity of subregions of said identical size, which comprises: a processor array for sequentially comparing a given search block with each of the multiplicity of subregions in its corresponding search region and computing a multiplicity of absolute values of difference in the mean luminance level between the pixels present in the given search block and each of the subregions; a difference memory for storing the multiplicity of the absolute values of difference; a difference comparator for comparing each of the multiplicity of the absolute values stored in the difference memory and selecting a subset of minimum absolute values of difference having an identical minimun value; a motion vector memory for storing a predetermined motion vector and a subset of candidate vectors representing the displacement of pixels between the given search block and each of a subset of the subregions entailing the subset of the minimum absolute values of difference having the identical minimum value; and a motion vector detector for comparing the predetermined motion vector with each of the subset of the candidate vectors to select a candidate vector from the subset which is closest to the predetermined motion vector, assigning the closest candidate vector as the motion vector of the search block and providing same to the motion vector memory as a predetermined motion vector for a subsequent search block.

BRIEF DESCRIPTION OF THE DRAWINGS

The above and other objects and features of the present invention will become apparent from the following description and the accompanying drawings in which.

DETAILED DESCRIPTION OF THE PREFERRED EMBODIMENTS

Figure 1:
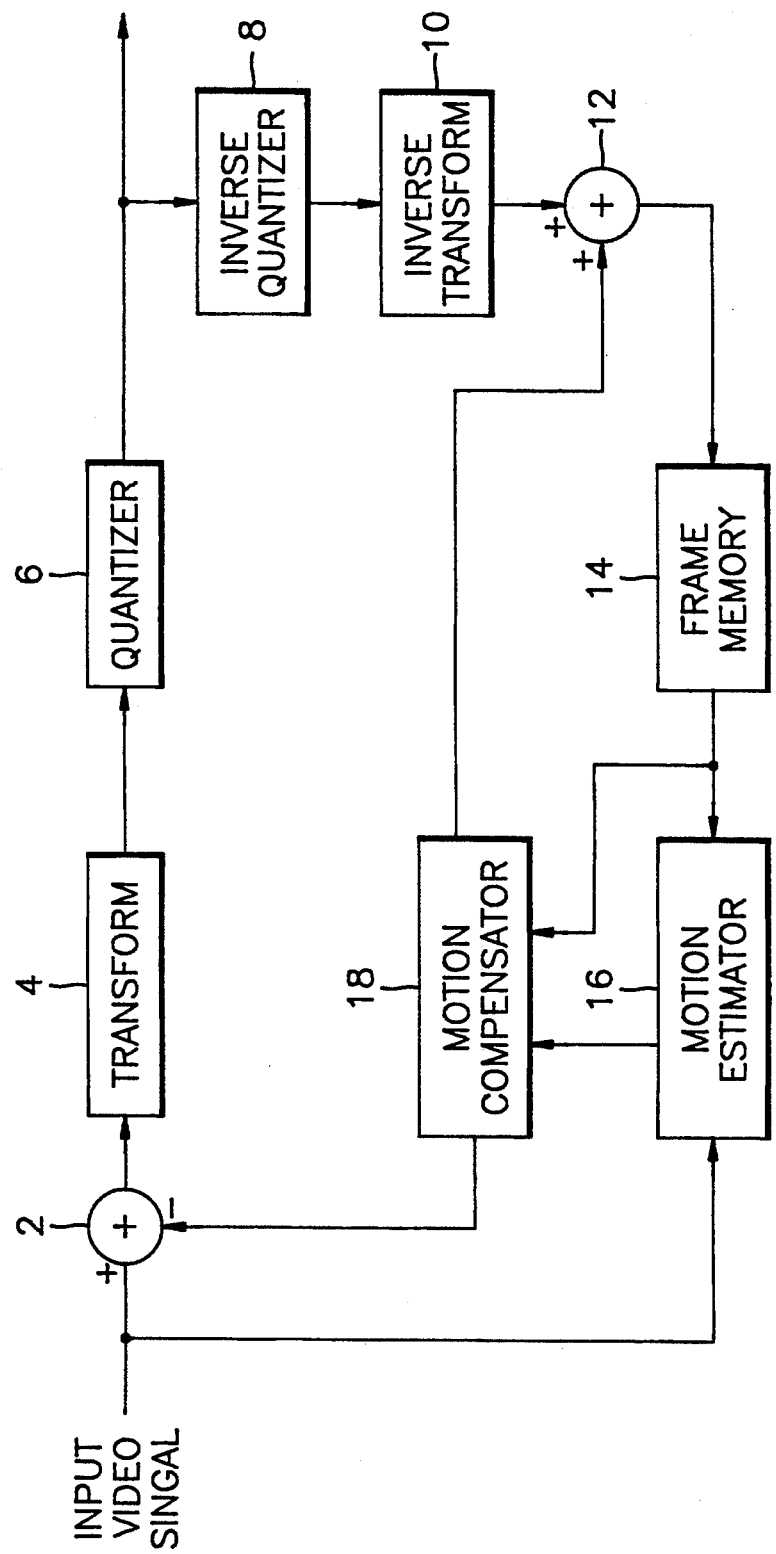
FIG. 1 is a typical block diagram of an apparatus for compressing a digital video signal.

Referring to FIG. 1, there is shown a block diagram of an apparatus for compressing a digital video signal, which comprises a motion estimator 16 of the invention.

An input digital video signal constituting one frame is fed to the motion estimator 16 and a subtractor 2. Actually, the input video signal is divided into a series of parts which are sequentially written into a number of segments in an input memory (not shown). The written signal parts are grouped into a predetermined number of blocks, which are sequentially read out from the input memory and provided to the motion estimator 16. Essentially at the same time, a previous video signal of one frame is read out from a frame memory 14 and provided to the motion estimator 16, wherein said previous video signal precedes the input video signal by a one-frame period. The motion estimator 16 defines motion vectors based on a comparison between the current frame of the input video signal and the previous frame of the previous video signal read out from the input memory and the frame memory 14, respectively. A motion compensator 18 determines a reference video signal block based on a motion vector, which is represented as an output signal from the motion estimator 16. The motion compensator 18 outputs the reference signal block as an input signal to the subtracter 2 and an adder 12.

The subtractor 2 calculates the difference between the reference signal block and the corresponding signal block of the video signal read out from the frame memory 14. An output signal from the subtractor 2 is subjected to an orthogonal transform by an orthogonal transform section 4. An adaptive quantizer 6 quantizes an output signal from the orthogonal transform section 4.

The output signal from the quantizer 6 is subjected to an inverse quantization by an inverse quantizer 8 and then an inverse orthogonal transform by an inverse orthogonal transform section 10. The adder 12 combines the output signal from the inverse orthogonal transform section 10 and the output signal representing the reference signal block from the motion compensator 18. The output signal from the adder 12 is written into the frame memory 14.

Figure 2:
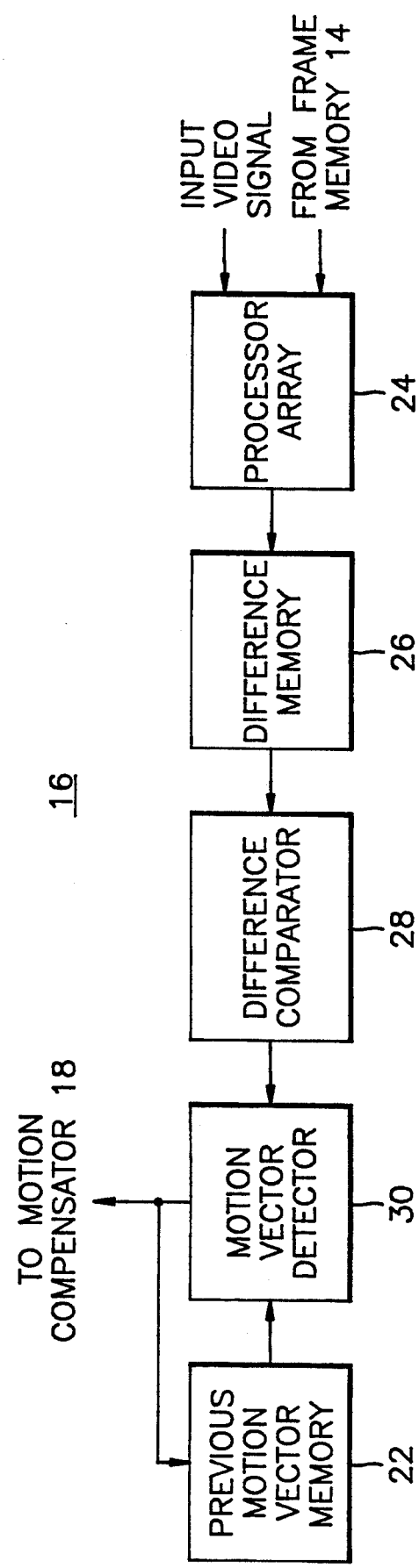
FIG. 2 is a block diagram of the motion estimator illustrated in FIG. 1 constructed in accordance with the present invention.

FIG. 2 is a detailed block diagram of the motion estimator 16 shown in FIG. 1 for determining accurate motion vectors from a sequence of video signals in accordance with the invention.

The current frame of the input video signal and the previous frame of the previous video signal are provided to a processor array 24, wherein the current frame is divided into a plurality of search blocks of an equal size and the previous frame is divided into a corresponding number of search regions, each region being further divided into a multiplicity of subregions of said equal size, The process array compares a search block taken from the current frame and a subregion sequentially selected within its corresponding search region and computes ADs in the mean luminance level of the pixels between the search block and the multiplicsty of the subregions so compared; and the computed results from the processor array 24 are sequentially transferred to a difference memory 26.

A difference comparator 28 sequentially compares the multiplicity of the ADs stored in the difference memory 26 and determines the smallest value among all the ADs. During the comparison, it may be found that there may be more than one AD equal to the smallest value forming a subset of minimum ADs. Thereafter, a subset of candidate vectors representing the displacement between the search block and the subset of subregions entailing the equivalent smallest value are derived and stored in a previous motion vector memory 22. The previous motion vector memory 22 also stores a predetermined motion vector which may be either the motion vector for a preceding search block in the current frame or the motion vector for a search block in the previous frame at a location corresponding to the search block in the current frame.

A motion vector detector 30 is used to detect a correct motion vector by using the predetermined motion vector stored in a previous motion vector memory 22. Specifically, the motion vector detector 30 selects the vector, among the subset of the candidate vectors, closest to the predetermined motion vector. The closest vector so selected by the motion vector detector 30 becomes the motion vector of the search block and is provided to the previous motion vector memory 22 as the predetermined motion vector for a subsequent search block in the current frame.

Figure 3:
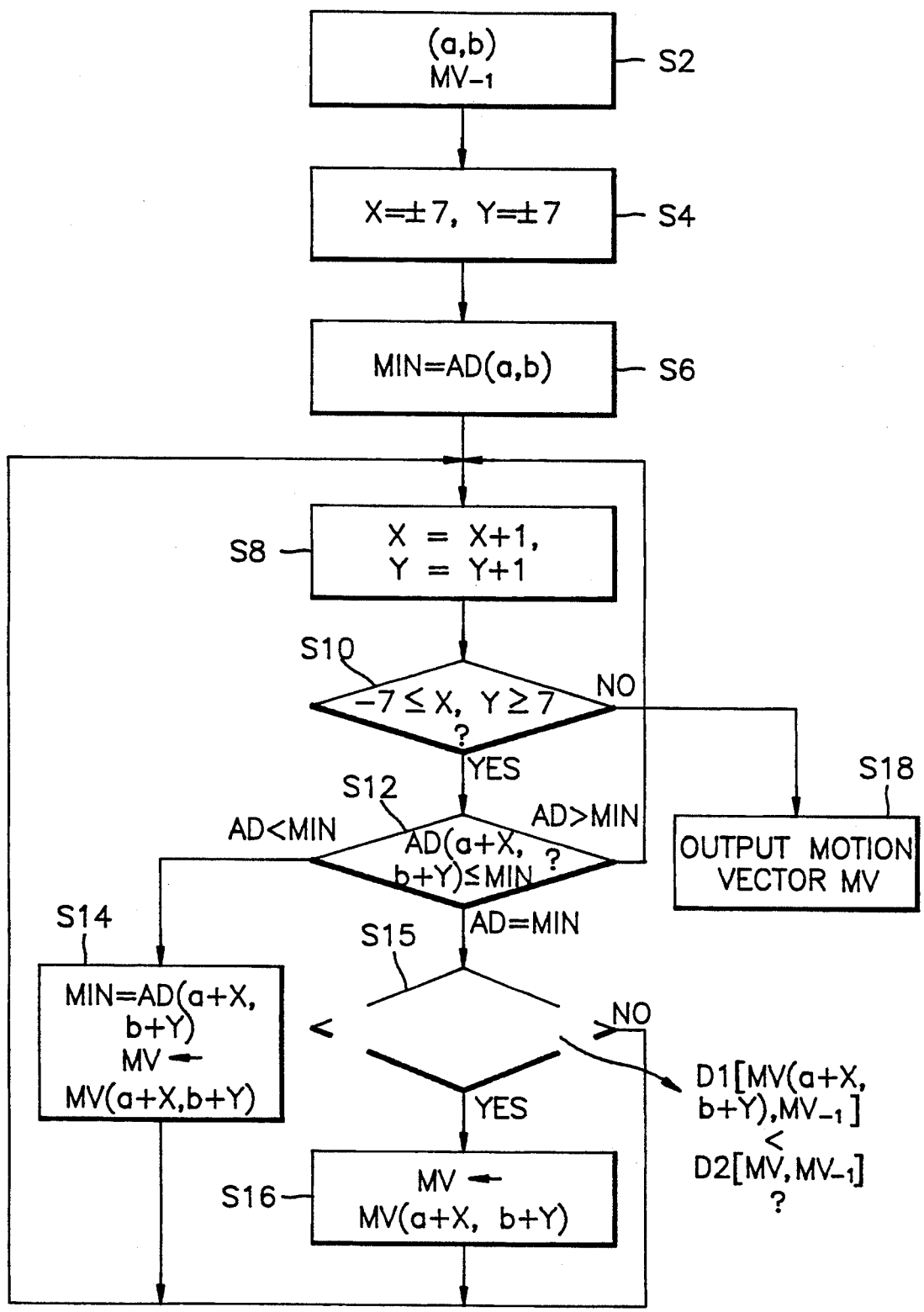
FIG. 3 is a flow chart illustrating the method of determining the motion vector in accordance with the invention.

FIG. 3 is a flow chart illustrating the inventive method of detecting motion vectors performed in the motion estimator 16 as shown in FIG. 2. In step S2, the search block of the current frame is selected and defined as, e.g., a 16×16 pixel block size and its corresponding search region of the previous frame is selected; and the center of a subregion located at the middle of the corresponding search region is defined in terms of a coordinate (a,b). Further, the predetermined motion vector from the previous motion vector memory 22 (FIG. 2) is prepared as $MV_{-1}$.

In step S4, a range in the corresponding search region from the center coordinate is initiallized. In this illustration, the range is chosen as X,Y[±7, ±7] wherein X and Y denote the horizontal and the vertical directions.

In step S6, the smallest value MIN among the ADs to be compared and its corresponding motion vector MV to be detected are initiallized. The smallest value is expressed as follows:

$$MIN = AD(a,b)$$

In step S8, the center coordinate (a,b) is shifted by increases of 1 in both horizontal and vertical directions in order to calculate the AD(a+X, b+Y) in the luminance level of the pixels present in the search block and those in a subregion within the corresponding search region which has the shifted center coordinate (a+X, b+Y).

In step S10, it is checked whether the respective increased values X,Y are within the search range[±7,±7]. If the respective increased values X,Y are within the search range, the process advances to step S12. If not, the process goes to step S18.

In step S12, the calculated AD(a+X, b+Y) is compared with the minimum difference MIN which has been found up to now; and the latter becomes updated when said calulated AD(a+X,b+Y) is found to fall below the minimum difference MIN.

In accordance with the present invention, results of the comparision in step S12 may encompass three cases: a first case wherein the calculated AD(a+X, b+Y) is below the minimum difference MIN; a second case wherein the calculated AD(a+X, b+Y) is above the minimum difference MIN; and a third case wherein the calculated AD(a+X, b+Y) equals the minimum difference MIN.

In the first case, as shown in step S14, the minimum difference MIN is substituted or updated with the calculated AD(a+X, b+Y). And then the vetor MV(a+X, b+Y) derived from the updated minimum difference AD(a+X,b+Y) becomes the motion vector MV for the time being.

Thereafter, the process returns to step S8 to shift the coordinate to a new location within the search region.

In the second case, the minimum difference MIN and the motion vector MV are not changed; and the process returns to step S8.

In the third case, in step S15, each of the motion vectors MV derived from the minimum difference MIN and MV(a+X, b+Y) derived from AD(a+X, b+Y) is compared with the predetermined motion vector MV$_{-1}$ prepared in step S2. That is, the difference D1 between the predetermined motion vector MV$_{-1}$ and the motion vector MV(a+X, b+Y) is calculated; and the difference D2 between the predetermined motion vector MV$_{-1}$ and the motion vector MV is also calculated. If the difference D1 is less than the difference D2, the motion vector MV(a+X,b+Y) will substitute the motion vector MV in step S16; and the process returns to step S8. If not, the process directly returns to step S8. At this time, the minimum difference MIN will not be changed or updated since it is the same as AD(a+X,b+Y). After a complete search with respect to the entire multiplicity of subregions within the search region selected for the given search block in step S10, the motion vector MV which has survived the above process will be provided to the motion detector 16 shown in FIG. 1 and to the previous motion vector memory 22 shown in FIG. 2. And the above process will be repeated for a subsequent search block from the current frame and its corresponding search region from the previous frame.

While the present invention has been described with reference to the particular embodiments, it will be apparent to those skilled in the art that various changes and modifications may be made without departing from the spirit and the scope of the invention as defined in the following claims.

What is claimed is:

1. A method for determining motion vectors between a current frame and its preceding frame of video signals, wherein the current frame is divided into a plurality of search blocks of an identical size and the preceding frame is divided into a corresponding number of search regions, each search region being further divided into a multiplicity of subregions of said identical size, which comprises the steps of:

(a) comparing a given search block with a subregion selected from its corresponding search region and calculating the absolute value of difference in the mean luminance level between the pixels present in the search block and the pixels present in the selected subregion;

(b) repeating step (a) above for each of the remaining subregions in said corresponding search region to thereby obtain a multiplicity of the absolute values of difference;

(c) selecting the smallest value among the multiplicity of said absolute values of difference and defining a subset consisting of all minimum absolute values equal to the smallest value;

(d) deriving a subset of candidate vectors from the subset of said minimum absolute values, each candidate vector representing the displacement of the pixels between the search block and a subregion, entailing a corresponding minimum absolute value equal to the smallest value;

(e) comparing a predetermined motion vector retrieved from a storage means with the subset of said candidate vectors to determine the candidate vector closest to the predetermined motion vector;

(f) assigning the closest candidate vector as the motion vector of the search block and storing said closest candidate vector in the storage means as the predetermined motion vector for a subsequent search block; and (g) repeating steps (a) to (f) until the entire current frame is searched against its entire preceding frame, to thereby determine the motion vectors therebetween.

2. An apparatus for determining motion vectors between a current frame and its preceding frame of video signals, wherein the current frame is divided into a plurality of search blocks of an identical size and the preceding frame is divided into a corresponding number of search regions, each search region being further divided into a multiplicity of subregions of said identical size, which comprises:

a processor array for sequentially comparing a given search block with each of the multiplicity of subregions in its corresponding search region and computing a multiplicity of absolute values of difference in the mean luminance level between the pixels present in the given search block and each of the subregions;

a difference memory for storing the multiplicity of the absolute values of difference;

a difference comparator for comparing each of the multiplicity of the absolute values stored in the difference memory and selecting a subset of minimum absolute values of difference having an identical minimun value;

a motion vector memory for storing a predetermined motion vector and a subset of candidate vectors representing the displacement of pixels between the given search block and each of a subset of the subregions entailing the subset of the minimum absolute values of difference having the identical minimum value; and a motion vector detector for comparing the predetermined motion vector with each of the subset of the candidate vectors to select a candidate vector from the subset which is closest to the predetermined motion vector, assigning the closest candidate vector as the motion vector of the search block and providing said closest candidate vector to the motion vector memory as a predetermined motion vector for a subsequent search block.

* * * * *